Dec. 25, 1956  J. M. CUNNINGHAM  2,775,297
RECORD CONTROLLED PERFORATING MACHINE
Filed May 1, 1952  11 Sheets-Sheet 1

INVENTOR
JAMES M. CUNNINGHAM
BY
AGENT

INVENTOR
JAMES M. CUNNINGHAM
AGENT

Dec. 25, 1956  J. M. CUNNINGHAM  2,775,297
RECORD CONTROLLED PERFORATING MACHINE
Filed May 1, 1952  11 Sheets-Sheet 6

INVENTOR
JAMES M. CUNNINGHAM
BY
AGENT

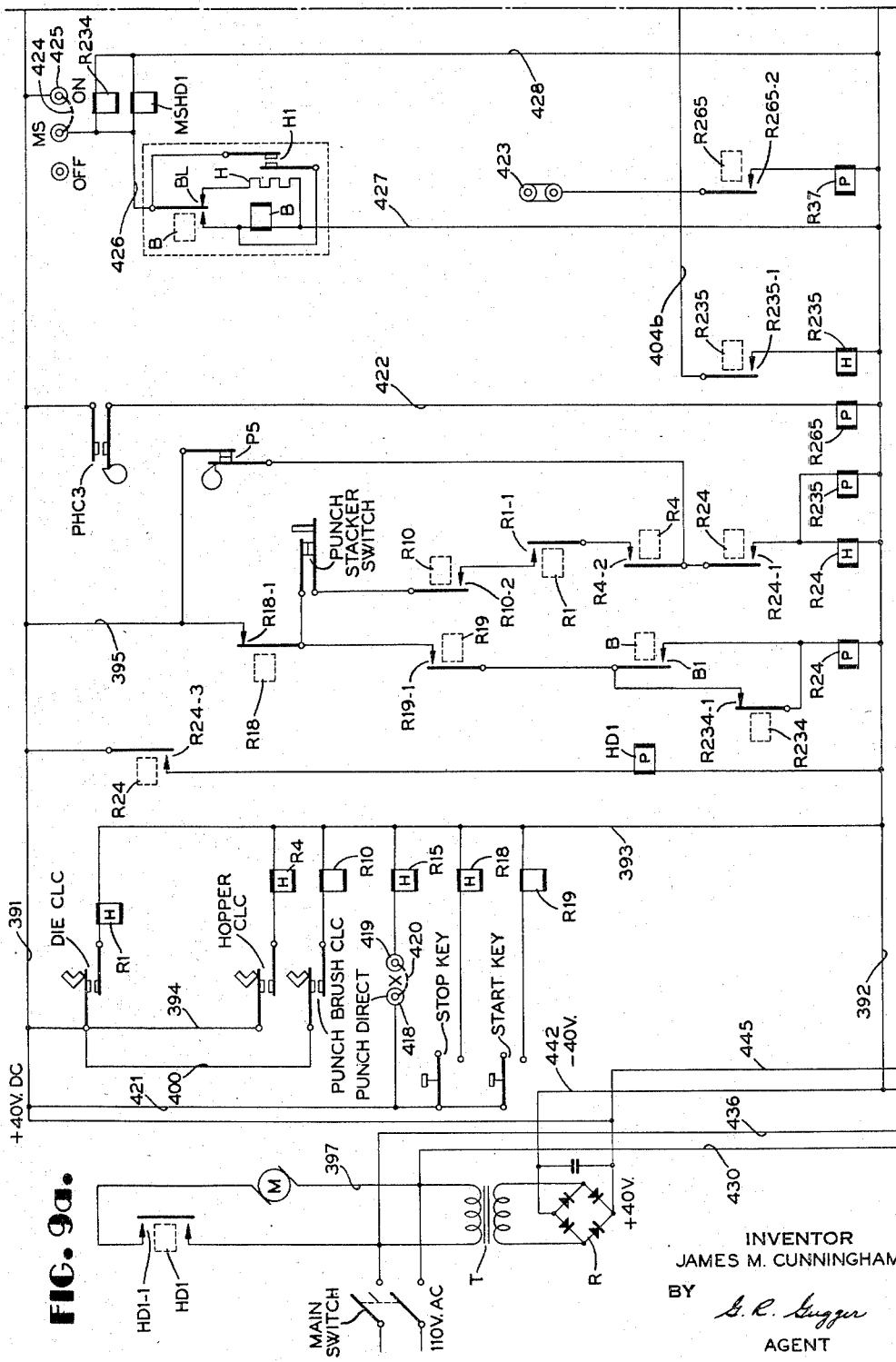

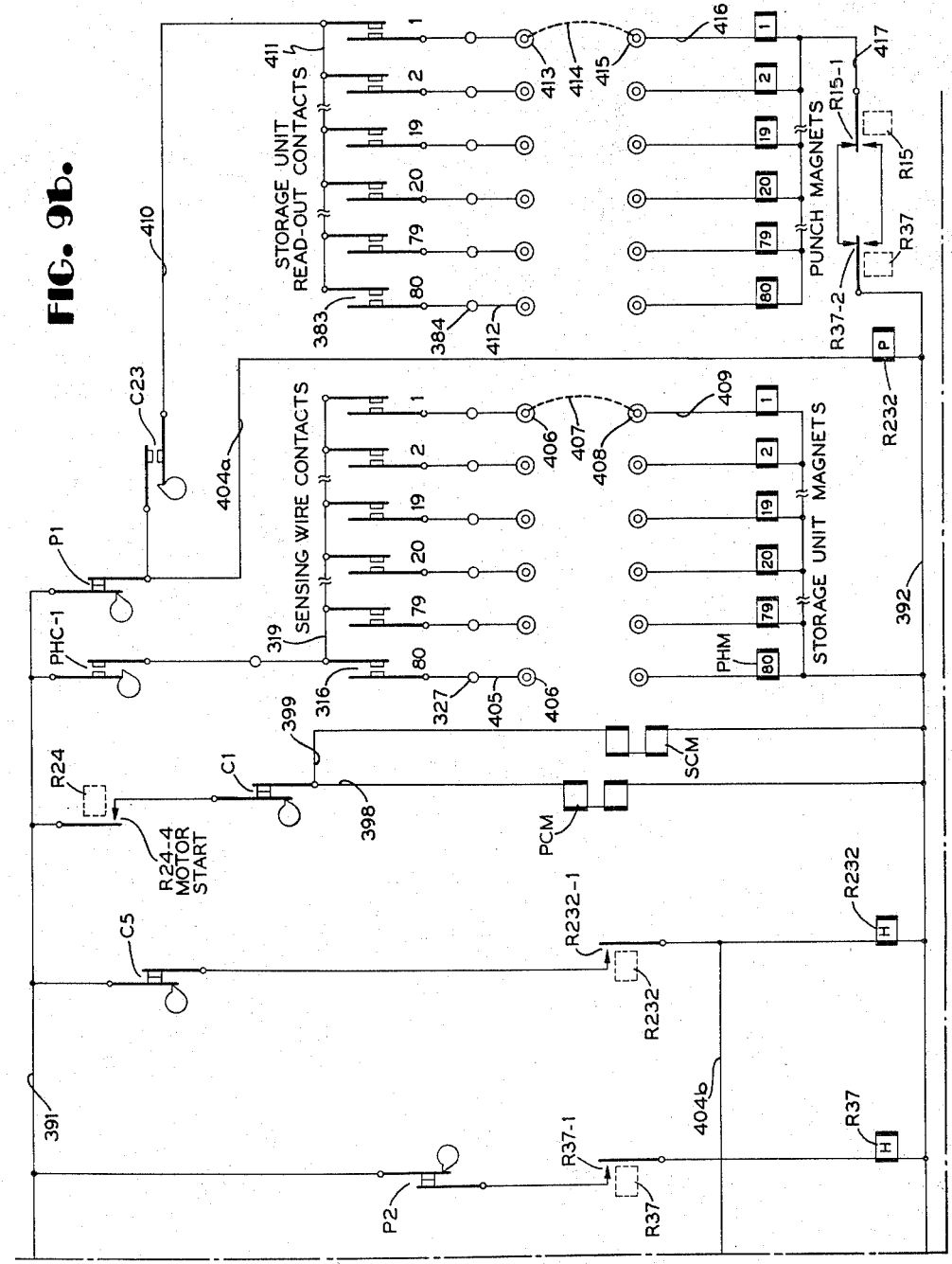

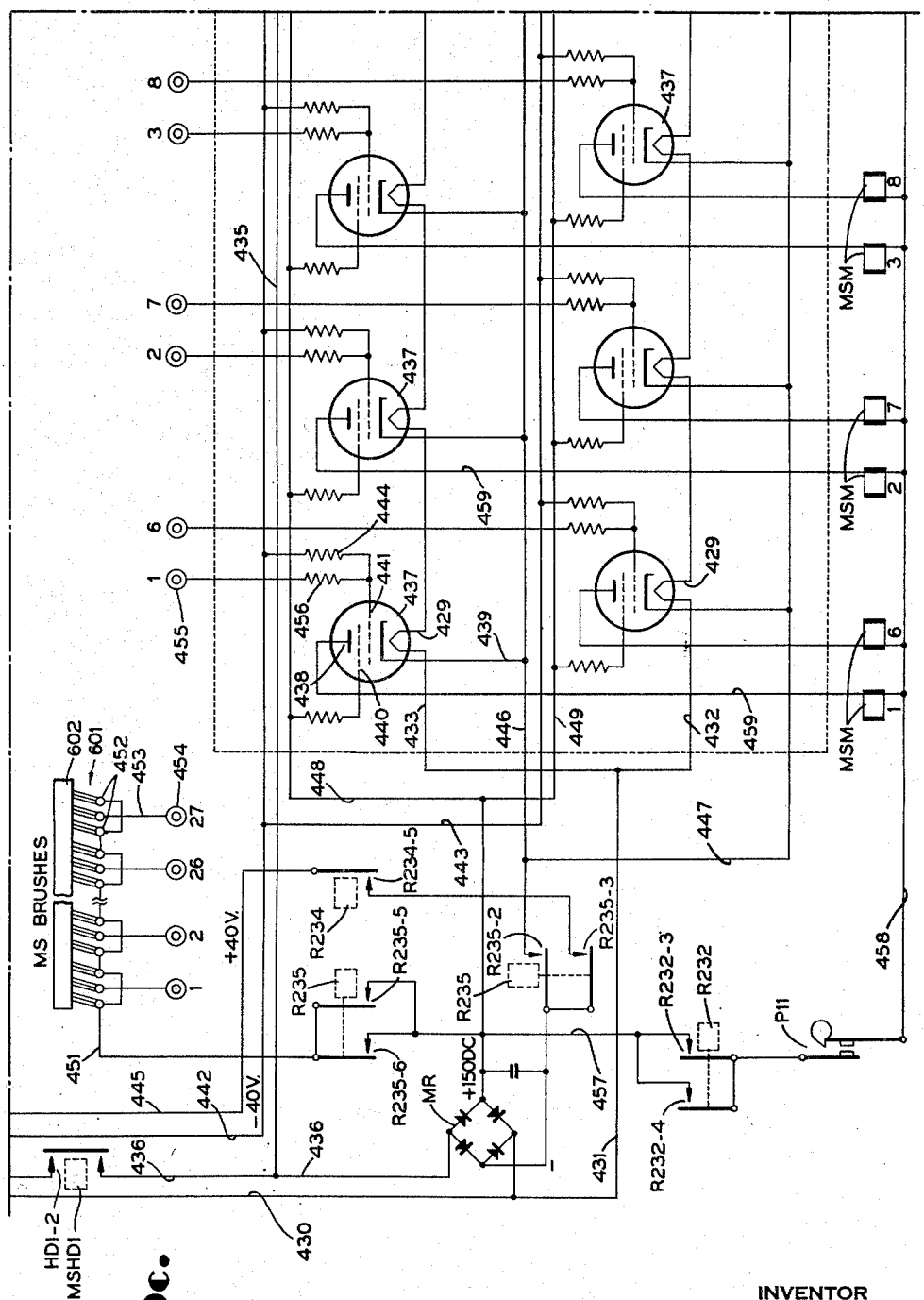

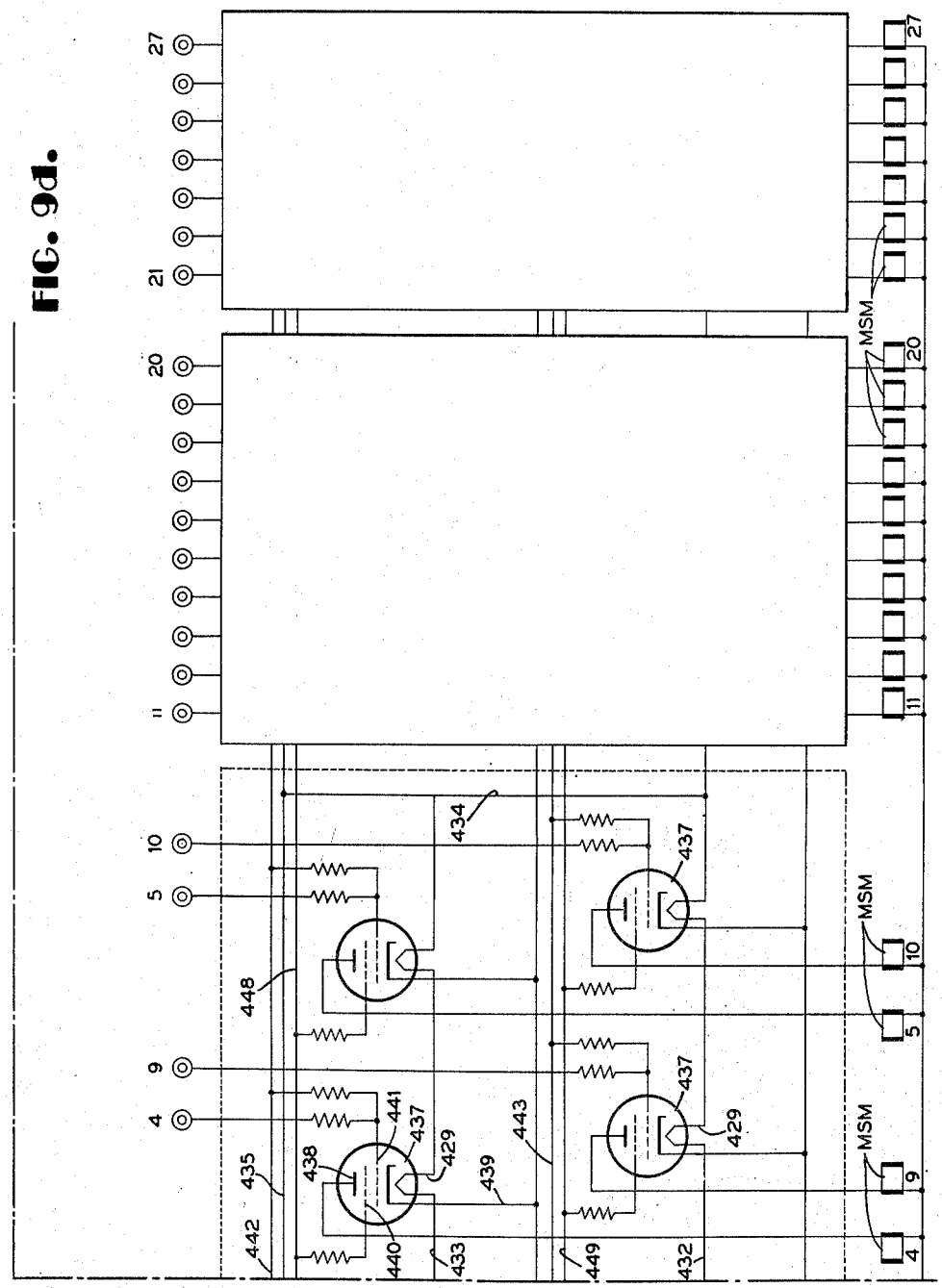

Dec. 25, 1956   J. M. CUNNINGHAM   2,775,297
RECORD CONTROLLED PERFORATING MACHINE
Filed May 1, 1952   11 Sheets-Sheet 11

INVENTOR
JAMES M. CUNNINGHAM
BY
AGENT

United States Patent Office 2,775,297
Patented Dec. 25, 1956

2,775,297
RECORD CONTROLLED PERFORATING MACHINE

James M. Cunningham, Endicott, N. Y., assignor to International Business Machines Corporation, New York, N. Y., a corporation of New York Application May 1, 1952, Serial No. 285,566

4 Claims. (Cl. 164—115)

This invention relates to a machine for perforating record cards, and more particularly to a perforating machine for converting small pierced holes on record cards into larger holes.

In the record controlled accounting machine art, the record used is the well-known type of card having columnar areas of twelve index point positions with rectangular holes punched in some of the index point positions to indicate data entered into the card. For some applications of machine accounting it has become advisable to record the original data into the card in the form of small pierced holes and then later convert the pierced holes into standard size punched holes.

In the illustrative embodiment, the present invention is shown arranged for operation in the punching section of the well-known type of high speed reproducing perforation machine, described in Reissue Patent No. 21,133. It is to be understood that the present invention may also be arranged for carrying out a reproducing operation.

The present invention comprises a novel wire sensing unit for sensing the pierced holes and a novel rotary type of data storage means, which may be operated, in synchronism, with the record card feeding mechanism in the punching section and/or the reading section of the above referred to high speed reproducing machine. The sensed data, represented by the differentially disposed pierced holes, are stored for a predetermined number of cycle points of the machine. Upon the passage of the sensed record cards under the punches, the said synchronously operated storage means become effective to control the operations of the punches, thereby effecting perforating of the sensed record cards in positions corresponding to the sensed pierced holes. It should be pointed out also, that the wire sensing unit can be used to sense standard punched holes in the record card, either alone or in combination with the pierced holes, and that concurrent entry of both types of the sensed data can be made into the storage means should it be desired to convert the pierced holes to standard punched holes and at the same time transpose the original standard punched holes to another field of the sensed record card.

In addition, it has been found that some applications may require the recording of pierced holes in records having differentially positioned conductive marks thereon, or vice versa, in which case, it may be desirable to convert both the pierced holes and the conductive marks into standard punched holes. As a result, the present invention includes the necessary sensing mechanism, which may be of the type described in U. S. Patent No. 2,275,396, for sensing differently positioned conductive marks on successive record cards for effecting the punching of perforations thereon, in positions corresponding to the sensed conduction marks. The sensed data, represented by the differently disposed conductive marks are stored in the storage means for a different predetermined number of cycle points from the pierced hole entries and all of the perforations corresponding to the sensed conductive marks and pierced holes are concurrently punched.

Accordingly, an object of the present invention is to provide an improved perforating machine, for converting small pierced holes on record cards into larger holes.

Another object of the present invention is to provide an improved perforating machine, for concurrently converting small pierced holes and conductive marks on record cards into standard perforate data designations.

Another object of the present invention is to provide an improved sensing unit which is adapted for sensing small pierced holes as well as standard size punched holes on record cards for effecting entry of either or both of the sensed data into a single storage device.

Still another object of the present invention is to provide an improved data storage device, which is operated in synchronism with the record feeding means, for controlling the perforating operations at a later time in the machine cycle.

Still another object of the present invention resides in the provision of an improved data storage device, as in the preceding object, wherein sensed data representing pierced and/or punched holes may be received and stored for a predetermined number of cycle points and also sensed data representing conductive marks may be received and stored for a different predetermined number of cycle points.

Still another object of the present invention is to provide an improved perforating machine wherein a single sensing means is provided for sensing both data designations and control designations on a record.

Other objects of this invention will be pointed out in the following description and claims and illustrated in the accompanying drawings, which disclose, by way of example, the principle of the invention and the best mode, which has been contemplated, of applying that principle.

Figs. 9a through 9d together comprise the wiring diagram of the machine.

Figure 10:
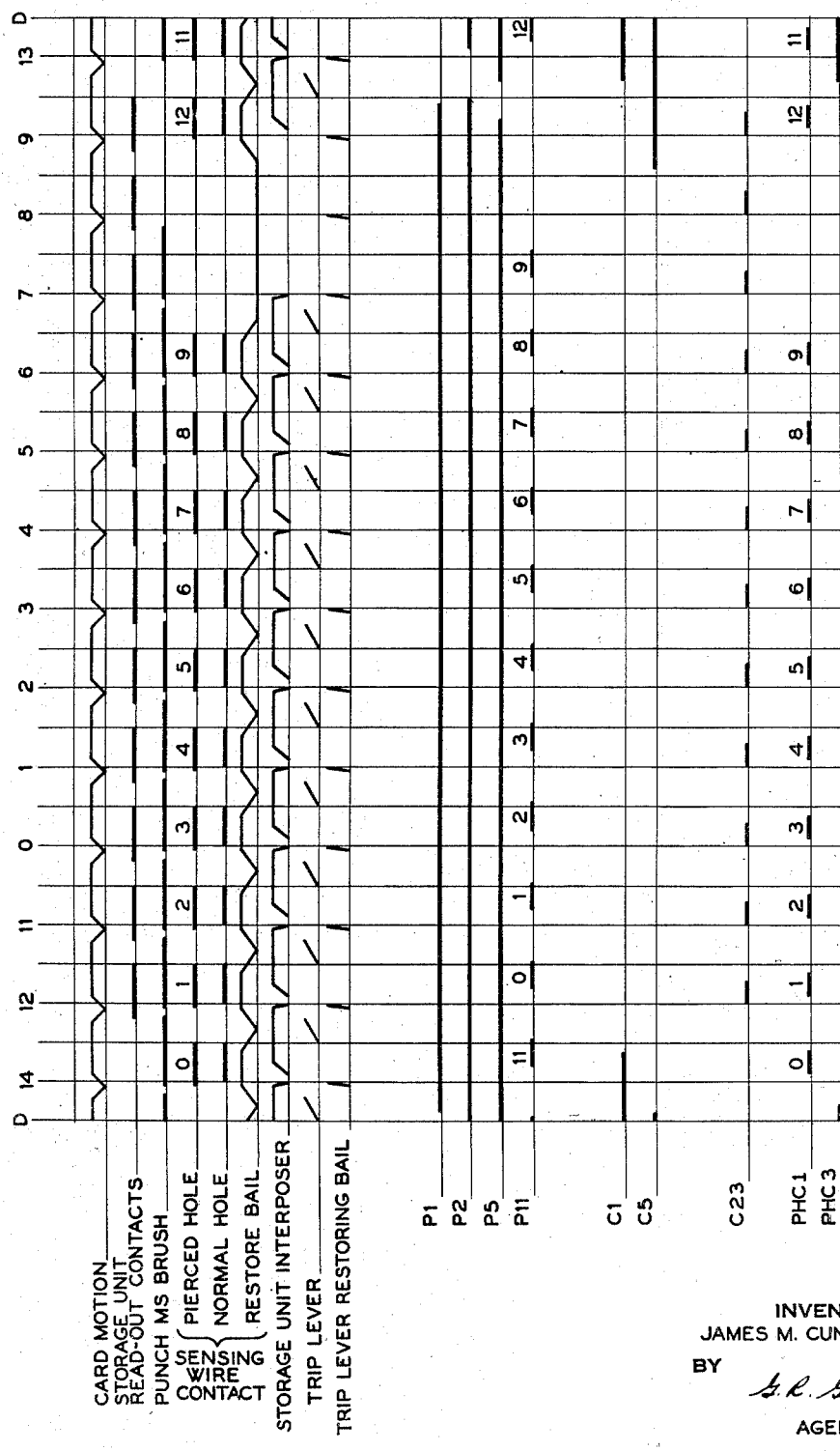

Fig. 10 is a timing diagram.

Figure 1:
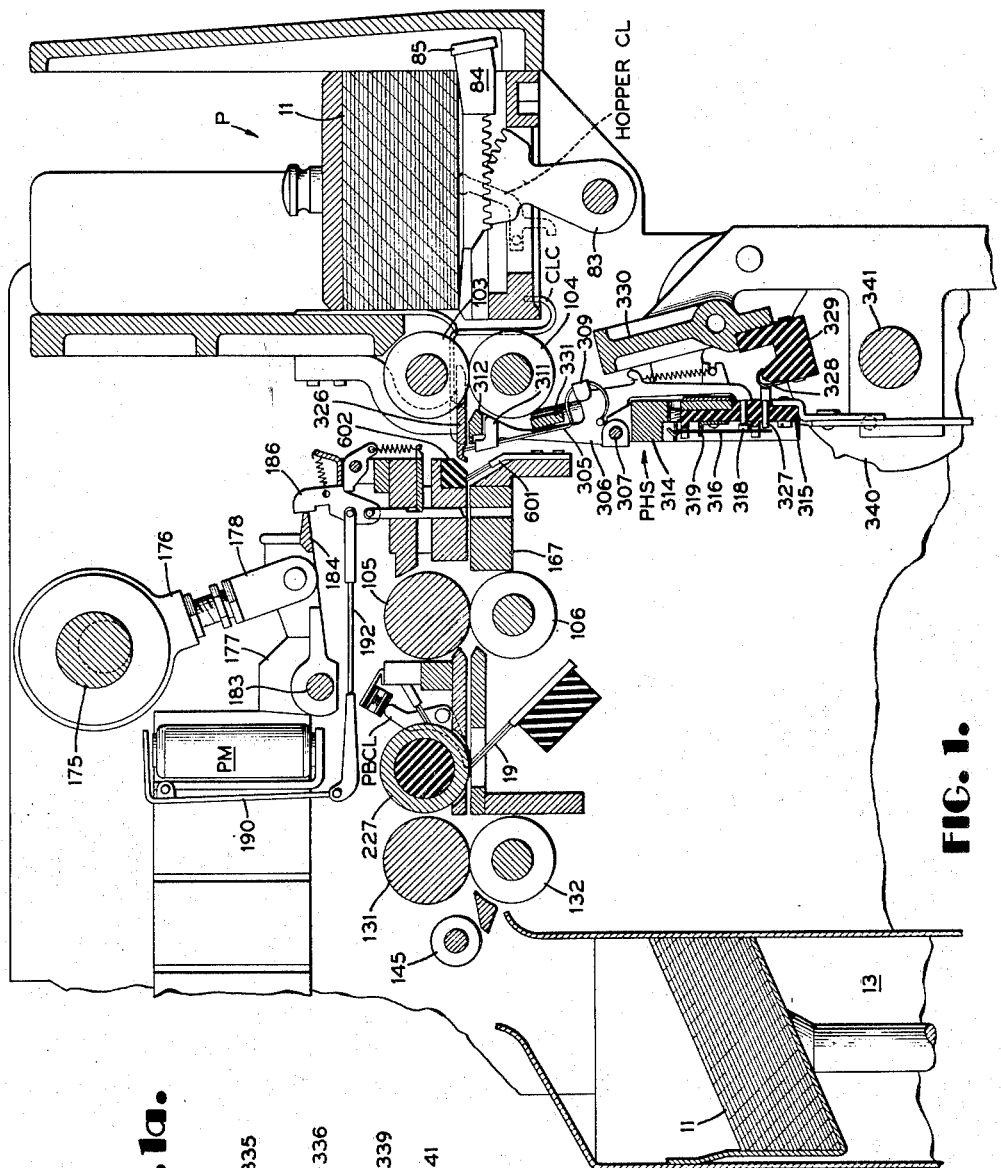
Fig. 1 is a sectional elevation view of the machine showing the feeding, sensing and perforating devices.
Figure 2:
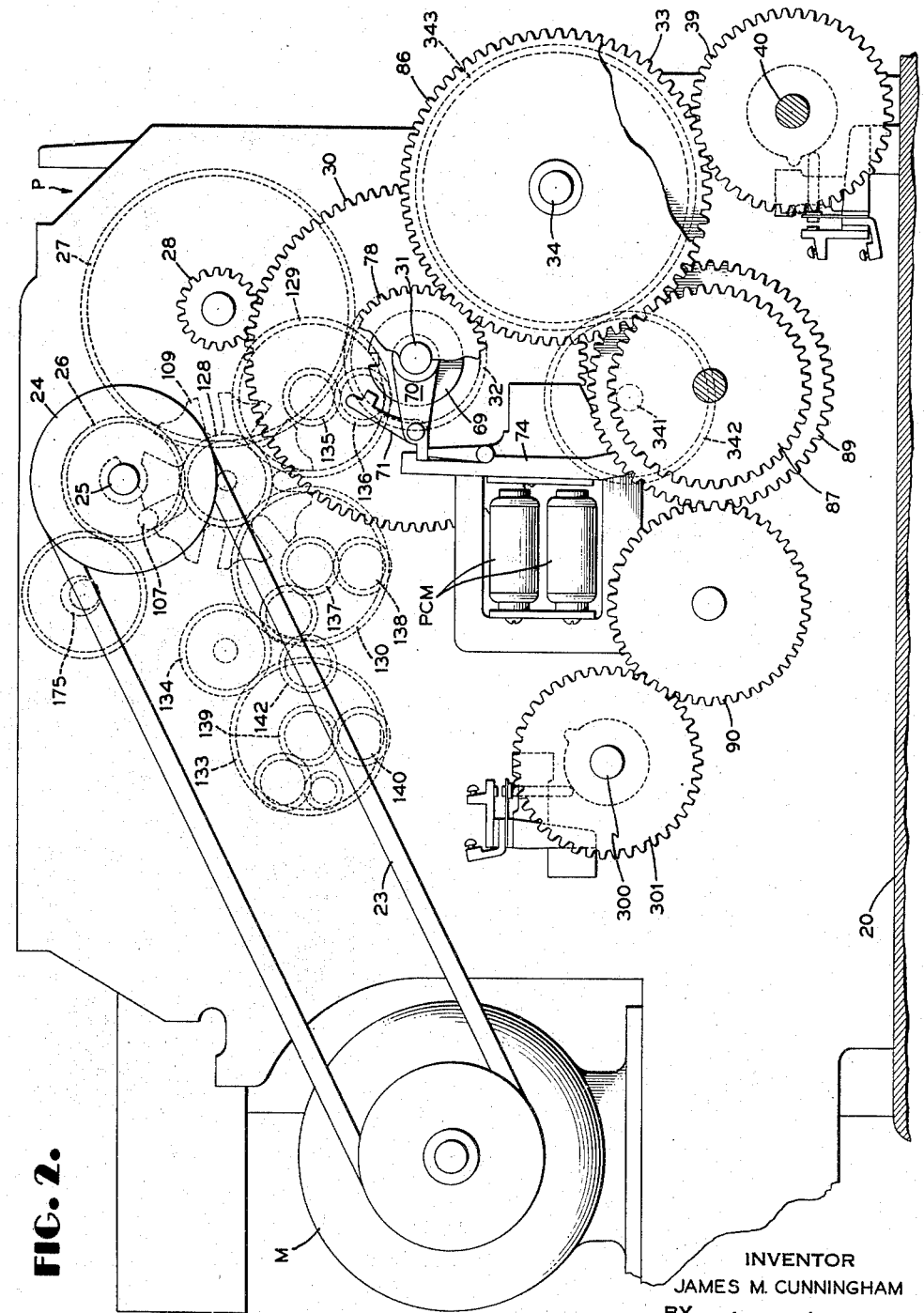
Fig. 2 is a side elevation view showing the various driving instrumentalities of the machine.

In Figs. 1 and 2, there are shown the essential elements of the punching section of the card reproducing machine disclosed in the Reissue Patent No. 21,133, referred to hereinabove, and in briefly describing the operation of the said machine, the same reference characters are employed, as in the patent to facilitate ready reference thereto for further detailed explanation thereof. The present invention is concerned with only the punching section of said machine and therefore, it is deemed unnecessary to show or describe the read section of the reproducing machine. The reference numerals applied to the mechanism of the subject novel devices will accordingly begin with number 300.

The record cards 11 are fed from the hopper P by the oscillating arm 83, reciprocating slide 84, and picker 85 to the feed rollers 103, 104, which rollers convey the said card past the new pierced hole sensing unit, indicated generally as PHS on Fig. 1. It will be noted that sensing units PHS replaces the usual punch master card brushes 17 shown in the said reissue patent. The card is then moved past a mark sensing station, which is disposed ahead of the punching station and comprises the sensing brush assembly 601 and insulating bar 602 (shown similarly in said Patent 2,275,396). From the mark sensing station, the card is conveyed to and past the punching station, comprising a row of punches 18 and die 167. Rollers 105, 106 then convey the punched card past the sensing station, comprising brushes 19 and contact roller 227, and, by means of rollers 131, 132 and deflecting roller 145, the said punched card is conveyed to discharge hopper 13. The sets of rollers which convey the record card through the punching section of the machine are intermittently driven, so that the card is advanced in steps, with each row of index point positions pausing momentarily in the punching position to receive a perforation, if, at such time the magnet PM were energized.

Energization of the said magnet PM will rock its armature structure 190, drawing a link 192 toward the left to effect coupling between an interposer 186 and a plate 184. The plate 184 is carried by member 177 pivoted at 183 and oscillated, by means of a link 178 connected to an arm 176 on shaft 175.

Turning now to driving connections of the machine, it is noted that in Fig. 2 a motor M is mounted above the base 20 of the machine which also carries a pair of suitable side frames. The motor is connected by a driving belt 23 to a pulley 24 on a shaft 25 mounted on bearings in the side frame of the machine. Fixed to the shaft 25 is a gear 26 which serves to drive the continuously running devices of the machine.

The gear 26 meshes with a large gear 27 to which is attached a small gear 28. The small gear 28 meshes with a large punch clutch driving gear 30 which is pivoted on a punch feed drive shaft 31 and attached to another driving gear 32. The gear 32 meshes with another gear 33 pivoted at 34. This gear 33 in turn drives a gear 39 attached to a shaft 40. This shaft 40 is given a continuous movement in a clockwise direction and is used as a mounting for a number of C cams cooperating with C cam contacts to be mentioned hereinafter, and also serves as a source of drive to the rotary type data storage mechanism to be described later.

There are also a number of P cams attached to a shaft 300 for cooperation with P cam contacts to be later described. The shaft 300 is under control of the punched clutch shaft 31 and is driven through the gear connections 78, 86, 87, 89, 90 and gear 301 fixed on the shaft 300.

The punch clutch under hopper P is operated when connections are established between shaft 31 and the driving gear 30. Attached to gears 30 and 32 is a notched disc 69 loose on shaft 31. Adjacent the disc is an arm 70 secured to shaft 31 and carrying a clutch pawl 71 pivoted thereon. The pawl has an extension adapted to fit into the notch in disc 69 and is urged to engage the disc by a suitable spring. However, the pawl is held disengaged by an armature latch 74 which engages an extending arm on the pawl. When the punch clutch magnet PCM is energized, the associated armature is attracted and latch 74 is rocked about a pivot (not shown), releasing pawl 71, so that shaft 31 is connected to the driving gears.

When the shaft 31 is operated, driving devices carried thereon are made effective to actuate various card feeding means. A pair of complementary cams (not shown) serve to drive the card picker 84.

There are connections from the driving gear 26 to the punch feeding rollers 103, 104, 105 and 106 for feeding cards under the punch plungers 18. A roller 107 on a stud extending from the gear 26, forms a means for driving the Geneva step motion disc 109 with an intermittent movement. The punch feeding rollers are driven by gear connections rotated by disc 109 which comprise gears 128, 129, 130, 134, 133 and 135 to 142.

The description, up to this point, relates for the most part to the prior art machine described in greater detail in the aforementioned reissue patent which can be referred to for the description of the starting and operating control elements, and circuits for rendering the mechanism, which will be referred to hereinbelow, continuously operated.

In the description to follow, the record cards containing the pierced holes and/or the conductive marks are placed in the hopper P, and are fed face down, twelve edge first, individually and successively therefrom by the card picker 84 to the feed rollers 103, 104.

Figure 5:
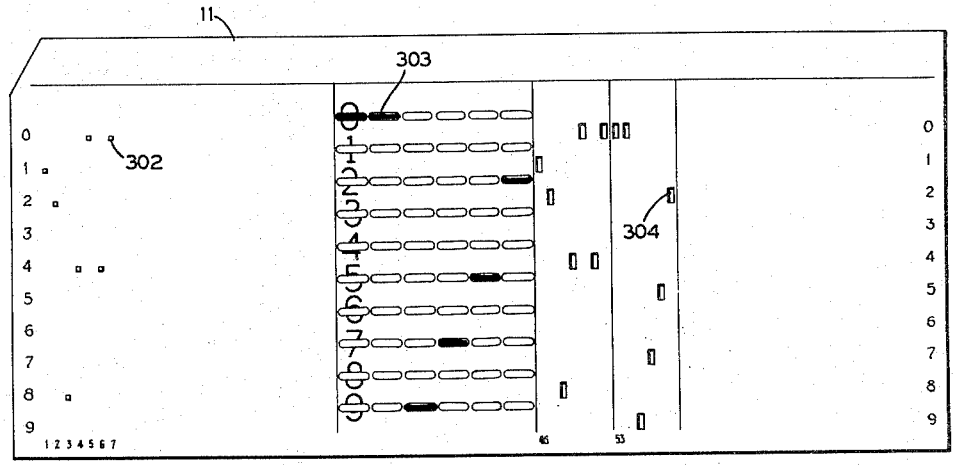
Fig. 5 is a view of a typical record card.

A typical record card is shown in Fig. 5 having pierced holes 302 at the "8," "4," and "0" index point positions and conductive marks 303 formed at the "9," "7," "5," and "2" index point or marking positions. This data is also shown transposed into standard size perforations 304, the perforations corresponding to the data represented by the pierced holes being disposed in columns 46 through 52 and the perforations corresponding to the data represented by the conductive marks being disposed in columns 53 through 58 of the record card.

These cards are then fed by the said feed rollers past the pierced hole sensing station PHS. The pierced hole sensing unit, as shown in Figs. 1, 3a, 3b, and 3c, comprises a plurality of spaced sensing wires 305 which are individually disposed on a plurality of spaced levers 306 pivoted on a bar 307. There are, in fact, four hundred of these sensing wires, five for sensing each columnar position of the standard card and they are arranged with respect to the punching station, so that the index mark positions on the card are sensed three cycle points before the corresponding index mark positions sensed are fed to the punching station.

There are eighty of the levers 306, each lever supporting five sensing wires placed side by side. The lower extremity of each sensing wire is attached around a stud 308 on its associated lever and has a bent portion which is retained by two ears 309, 310 of the lever in a fashion so that the upper extremity of the sensing wire extends up between the sides of a bracket member 311 integral with each lever 306. The bracket members 311 extend into slots of a comb plate 312 which serves as a part of the card bed for the punch feed. A guide block 311a is provided between the sides of each bracket member 311 providing a small rectangular hole between the block and the lever to guide the five sensing wires.

The lever supporting bar 307 is mounted in a comb member 313 which is slotted to receive the individual levers 306. The comb member 313 is an integral part of a block 314 which is suitably attached to the main casting 315, of an insulating material, of the sensing unit.

Mounted alongside the casting 315 and extending across the width of the sensing unit is a series of one hundred and sixty contact wires 316, there being two wires for each column of the record card. These contact wires are held in position by means of an adjustable insulator bar 317 and plungers 318 which serve to force the middle of the wires against the inner edge of individual slots in a conducting strip 319, which is attached to the main casting 315. There are eighty of the plungers 318 slidably mounted in the casting 315, and the adjustable bar 317 is slidably mounted in grooves 317a in side plates 317b of the casting 315. Set screws 320 are provided to adjust the bar 317 into a bend in one end of each contact wire to regulate the tension on the wires.

The plungers 318 are normally retained in an extended position against the contact wires by means of the lower extremities of the levers 306. Each lever is normally urged in a clockwise direction about bar 307 by means of a spring 321, extending between a projection 322 on the lever and a bar 323 positioned in a slot of a comb member 324. The comb member 324 is attached to the lower extremity of the block 314 and extends across the sensing unit serving as a guide for the levers 306.

As shown in Fig. 1, when there is no card at the sensing station, the sensing wires extend against one side of a notch in the underside of a plate 326 and the lower extremities of the contact wires are out of contact with the ends of a series of conducting inserts 327 mounted in the casting 315, there being one insert for each two contact wires.

Figure 3:
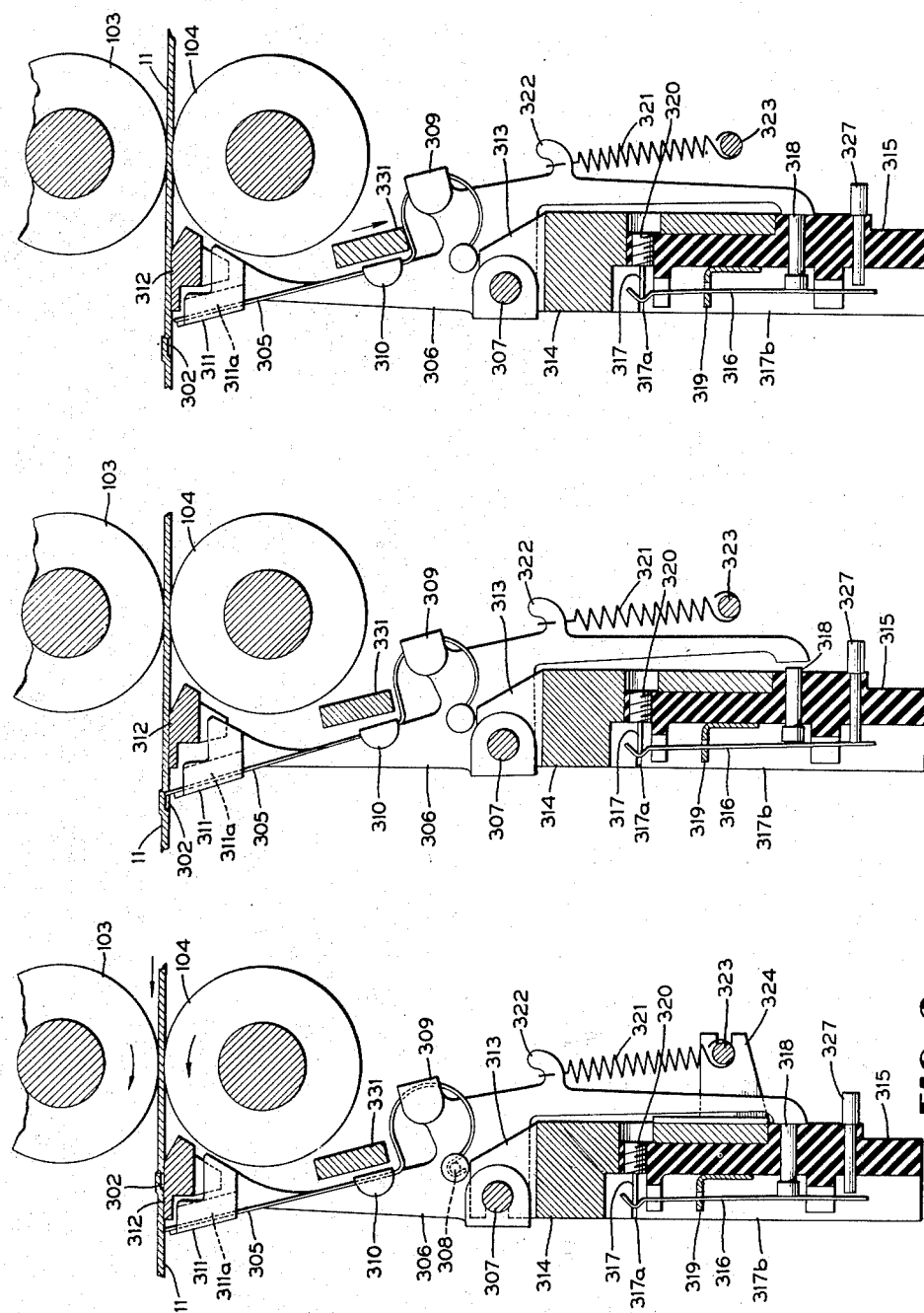
Fig. 3a is a sectional view showing the position of the components of the wire sensing unit when no perforations are being sensed.
Fig. 3b is a sectional view showing the position of the components of the wire sensing unit when sensing a perforation.
Fig. 3c is a sectional view showing the position of the components of the wire sensing unit after operation of the restoring bail.

Turning now to Fig. 3a, there is shown the position of the sensing components during the sensing of a blank portion of the record card. The position of the components has not changed noticeably and the contact wires and conducting inserts are still out of contact with each other. Fig. 3b shows a sensing wire encountering a pierced hole and it will be noticed that the position of the components has now changed. The sensing wire now extends into the pierced hole and as the card moves in the direction of the arrows it pulls the sensing wire along with it causing the lever 306 to pivot counterclockwise. The lower extremity of the lever has been moved away from plunger 318 allowing the contact wires to push said plunger inwardly until the lower extremity of the contact wire contacts one end of the conducting insert 327.

The other end of the conducting insert is in contact with a contact wire 328 (Fig. 1), of which there is one for each insert, attached to an insulator block 329. The block 329 is attached to a bracket member 330 mounted in the frame of the punching machine. The contact wires 328 serve to complete circuits from the inserts 327 to the storage unit, by way of a plug board, as will be described later.

Turning now to Fig. 3c, the sensing components are shown restored to their normal position after the pierced hole has moved out of sensing position. It will be noted that contact between the insert 327 and the contact wire is now broken. The restoring of the components is accomplished by means of a restoring bail 331 which is cammed down once each cycle point against the bent portion of all the sensing wires. As a result, the wires are pulled down out of the pierced holes and the levers 306 are pivoted clockwise, by springs 321, until their lower extremities strike the main casting 315 and restore the plungers 318. When the bail 331 is returned upward, the sensing wires move upward slightly with respect to their levers, due to the tension in the bends, and are ready to sense the next perforation.

Figure 1A:
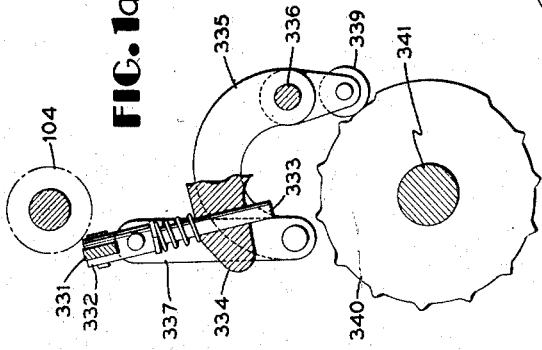
Fig. 1a is a view showing the arrangement of the restoring bail mechanism.

Referring to Fig. 1a, the restoring bail 331 is mounted at each end in a sleeve 332 integral with a rod 333 which is slidable in a support casting 334. At one end of the bail, a curved link 335, pivoted on an auxiliary shaft 336, is connected to the sleeve 332 by a link 337. A coil spring 338, extending between the sleeve and the support casting, normally urges link 335 to pivot clockwise to cause a follower 339, pivoted thereto, to ride on the periphery of a cam 340 fixed on a shaft 341 journalled in the side frames of the punching machine.

The cam 340 is continuously driven by means of a gear 342 (Fig. 2), attached to the shaft 341, meshing with a gear 343 pivoted on the stud 34 and pinned to continuously running gear 33. The periphery of the cam has eleven short projections and one long projection which correspond to the index point positions on the card. The record cards are fed through the feed of the punching machine "12" edge first and since the pierced hole sensing unit is disposed three cycle points ahead of the punching die, a pierced hole in the "12" index point position is sensed at "9" time on the machine index, as shown in Fig. 10. The cam is timed according to the reading of the card with the long projection effecting restoration of the sensing wires between the sensing of the "9" index point position on one card and the "12" index point position of the following card, which is actually between "6" and "9" time on the machine index. Movement of lever 335 by any of the projections will cause link 337 and the sleeve 332 to pull the restoring bail down against the sensing wires to restore them.

It will be understood that the pierced hole sensing unit can be used, in the same manner, to sense standard size perforations 304, either alone or in combination with the pierced holes, should it be desirable, for example, to transpose the standard punchings from one field to another field on the card.

Also, since the sensing unit is located in the position normally occupied by the punch X brushes of a standard reproducing punch, the sensing wires can be employed for sensing X punched holes and no punch X brushes are required.

From the pieced hole sensing unit PHS, the cards are moved past the mark sensing station comprising the conventional mark sensing brush assembly 601 and insulating bar 602. The mark sensing brushes are arranged with respect to the punching station, so that the index mark positions on the card are sensed two cycle points before the corresponding index mark positions sensed are fed to the punching station. The mark sensed readings are accordingly entered into the storage unit and stored for two cycles as will be described later.

Figure 4:
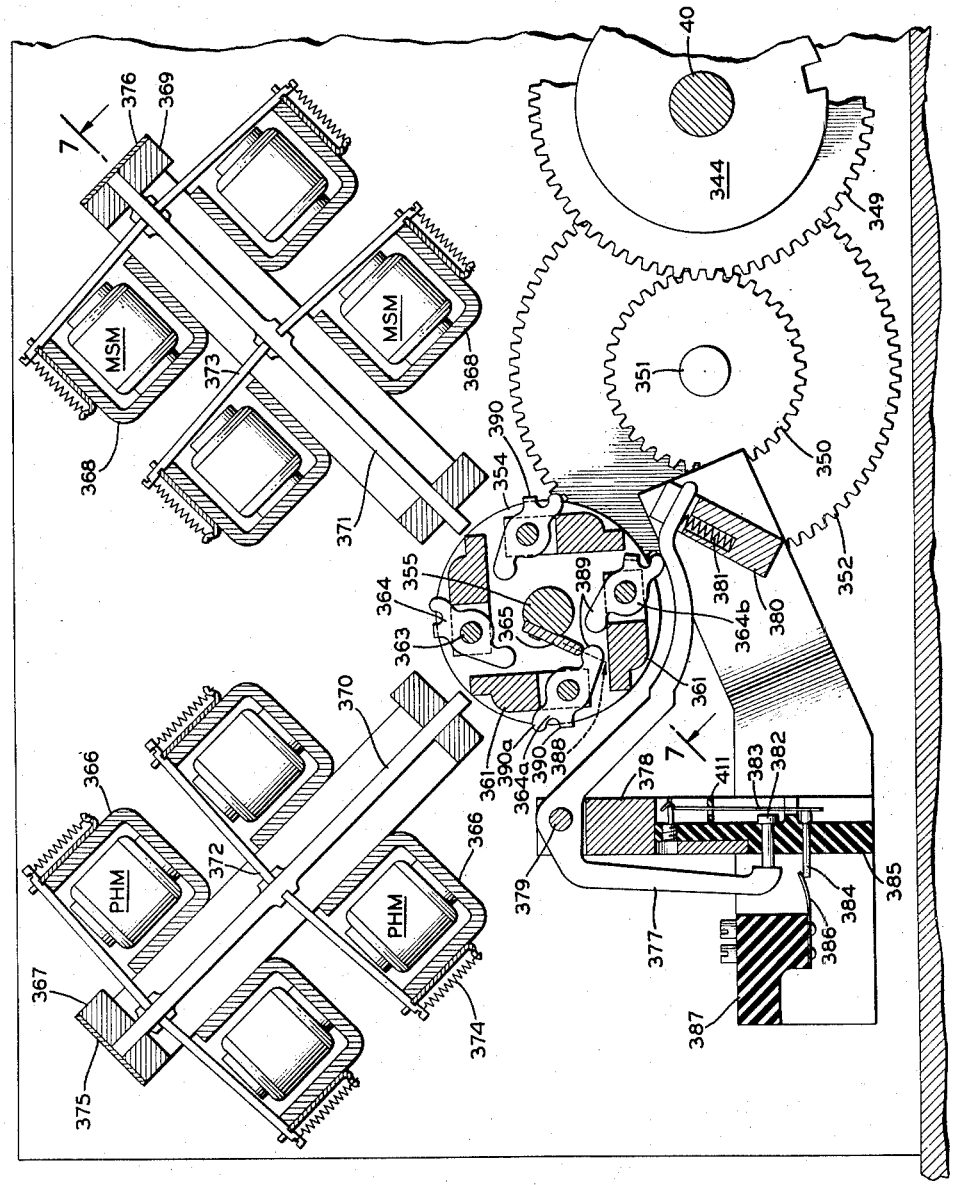
Fig. 4 is a side elevation showing the arrangement of the rotary storage device and read-out mechanism.
Figure 6:
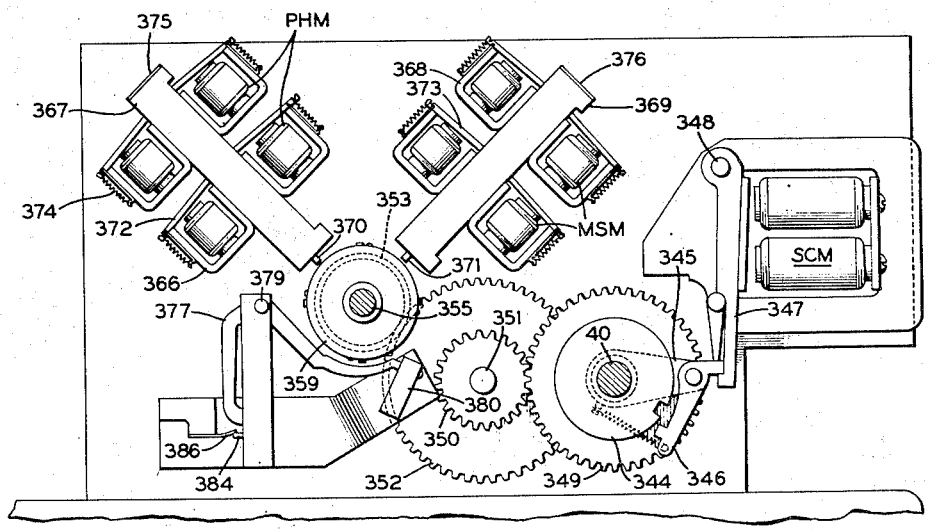
Fig. 6 is a side view showing the driving connections to the rotary storage device.
Figure 7:
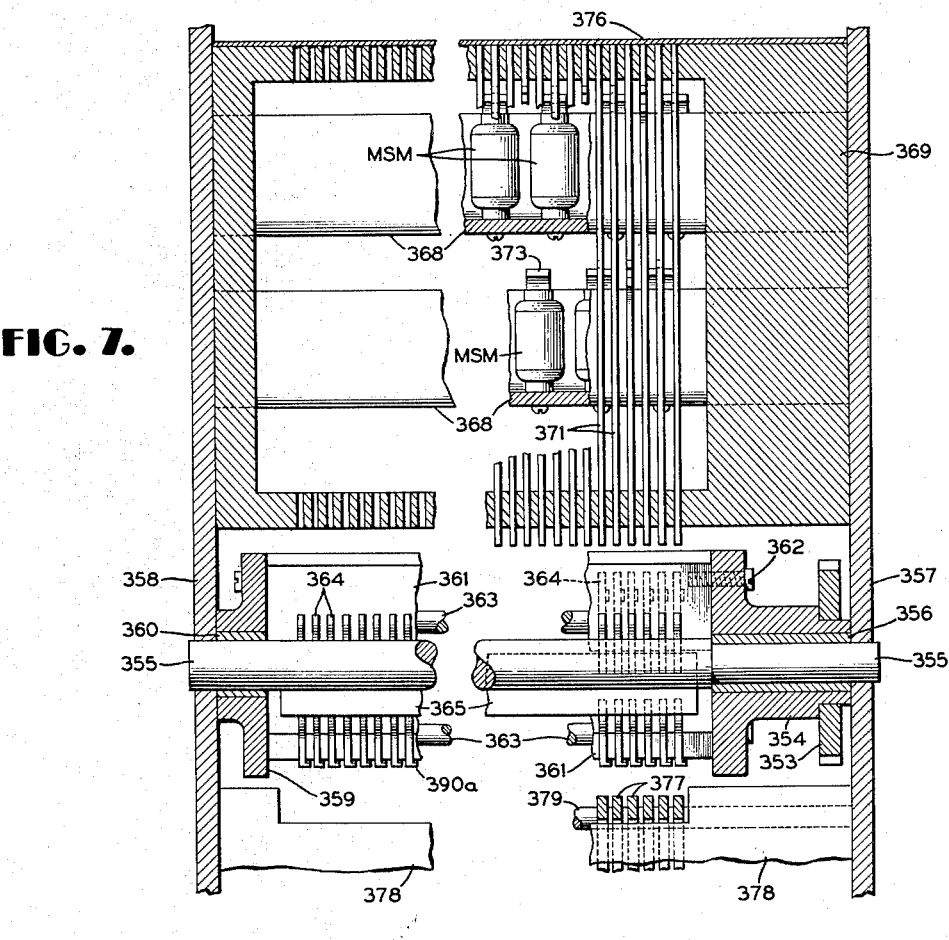
Fig. 7 is a sectional view taken on line 7—7 of Fig. 4.
Figure 8:
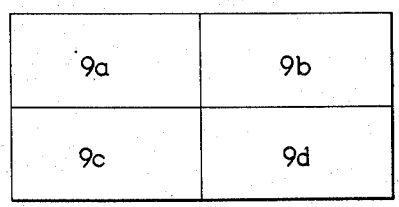
Fig. 8 is a diagrammatic showing of the figures that constitute the wiring diagram.

The data storage device for storing the pierced hole and/or punched hole readings for three cycle points and the mark sensed readings for two cycle points is shown in Figs. 4, 6, and 7. Referring to Fig. 6, a storage unit clutch is operated concurrently with the punch clutch of the punching machine. A notched disc 344 is fixed on the continuously running shaft 40. Adjacent the disc is an arm 345 loose on the shaft 40 and carrying a clutch pawl 346 pivoted thereon. The pawl has an extension adapted to fit into the notch in disc 344 and is urged to engage the disc by a suitable spring, not shown. However, the pawl is held disengaged by an armature latch 347 which engages an extending arm on the pawl. When a storage clutch magnet SCM is energized, the associated armature is attracted and latch 347 is rocked about a pivot 348, releasing pawl 346 and connecting arm 345 to the driving disc 344.

Arm 345 drives a gear 349, loose on the shaft 40 and attached to said arm. Gear 349 drives a gear 350 loose on a stud 351. A gear 352, integral with gear 350, drives a gear 353 and the storage device.

Referring to Fig. 7, the gear 353 is fixed to a side plate 354 rotatively mounted on a shaft 355 by means of a bearing 356. The shaft 355 is fixed to side frames 357, 358, of the storage device and rotatively supports, at its other end, a side plate 359 by means of a bearing 360. The side plates 354 and 359 are connected by four bars 361 equally spaced apart and attached to said side plates by means of screws 362.

The side plates and bars constitute the framework of a rotary storage drum which functions to store the sensed data for either two or three cycle points and then actuate a device for reading out the stored data. Extending through each of the bars 361 is a rod 363 which pivotally supports a series of eighty trip levers 364 positioned in eighty slots in the bar. The trip levers are individually actuated by a set-up mechanism, to be described, and in their actuated position, each trip lever represents a stored digit. A restoring bail 365 is rigidly attached to the shaft 355 for the purpose of restoring the trip levers after the stored digits have been read out of the storage device.

Each row of eighty trip levers represents an index point position across the eighty columns of the record card. It is possible, then, in one revolution of the drum, to store readings from four index point positions of the card such as, for example, the digits "1" through "4."

To take care of the twelve index point positions on the card, the storage drum is caused to rotate three and one-half times faster than the card feed, that is, three and one-half times per machine cycle. On a fourteen cycle point machine, as in the present case, the three revolutions of the drum will allow the storage of readings from the twelve index point positions with the one-half revolution taking care of the two cycle point distance between the index point positions on successive cards.

The set-up mechanism for actuating the trip levers in accordance with the data sensed on the card comprises two magnet units disposed between the side frames 357 and 358, with the magnets of each unit being arranged in four banks. Referring to Fig. 4, the left hand magnet unit consists of the eighty magnets PHM attached to bracket plates 366 which are fastened to opposite sides of a frame member 367 extending between the side frames 357 and 358. The PHM magnets receive impulses from the pierced hole sensing wires. The right hand magnet unit, similarly, consists of twenty-seven magnets MSM attached to bracket plates 368 which are fastened to opposite sides of a frame member 369 extending between the side frames 357 and 358. The MSM magnets receive impulses from the mark sensing brushes.

Positioned within each magnet unit is a series of interposers, indicated at 370 and 371. The interposers are slidable within their respective frames 367, 369 and each one has a notched portion adapted to receive the end of a magnet armature, as indicated at 372 and 373, of the particular magnet PHM or MSM associated therewith. Suitable armature springs 374 serve to retain the interposers in an upward position against top plates 375 and 376 of the frame members 367 and 369 when the magnets are de-energized.

Before describing the storage operation, it is thought advisable to describe the read out mechanism which serves to distribute the stored readings to the punch magnets of the punching machine. The read-out mechanism comprises a series of eighty contact levers 377, one for each columnar position. The contact levers are positioned in slots in a frame member 378 and are pivoted on a rod 379 which extends through said frame member. One end of each contact lever is spring biased in a slotted frame member 380 by means of a spring 381 so that each contact lever normally extends into the path of any of its associated columnar trip levers 364 that may have been actuated.

The other ends of the contact levers 377 actuate a contact arrangement which is identical to the one previously described in connection with the pierced hole sensing unit. It will suffice to say, then, that there are eighty plungers 382, actuated by said contact levers, which effectively cause the make or break of eighty pairs of contact wires 383 with eighty conducting inserts 384 suitably mounted in a non-conducting frame member 385. The conducting inserts contact a series of eighty read-out contact blades 386 attached to a non-conducting frame member 387. The read-out contact blades control energization of the punch magnets of the punching machine through the usual plug board connections.

As an example of how the storage device operates, assume that at "6" time on the machine index, a pierced hole representing the digit "9" is sensed by the pierced hole sensing unit. The sensing of the "9" digit causes the energization of an associated magnet PHM which, through the movement of its armature, pushes a related interposer downward into the path of the trip levers 364.

The storage drum rotates in a clockwise direction and is timed so that at any index point time the center line of the restoring bail 365, indicated by the dotted line 388 on Fig. 4, will extend through the center of a knock-off tip 389 of one of the trip levers. Assume, then, that the trip lever, indicated as 364a is in such a position when the digit "9" is sensed. The trip lever 364a is carried in a clockwise direction and as it sweeps past the actuated interposer, a bent over ear 390 on said trip lever will strike the end of the interposer causing the lever to pivot counterclockwise until its knock-off ear 389 strikes the edge of the related bar 361 (see trip lever 364b). In such a position, the trip lever presents a stored digit.

The trip levers are positioned one cycle point apart and it can be seen that it will take the trip lever 364a three cycle points to reach the position where an ear 390a can cam one of the contact levers 377 downward. Accordingly, at "9" time on the index, lever 364a will cam its related contact lever down to complete a circuit through the read-out contact to the punch magnet to punch the digit "9." As each trip lever sweeps past the restoring bail 365, its knock-off tip 389 will strike the end of the bail causing the lever to pivot clockwise until the ear 390a strikes the edge of the related bar 361, thus, resetting the lever to its normal position ready to receive another entry.

It can be understood that the storage device operates in the same manner as just described when sensing the standard size perforations. When sensing the conductive marks, the operation is the same except, that due to the position of the magnets MSM and the interposers 371, storage is for two cycle points instead of three to correspond with the position of the mark sensing brushes 601.

As previously mentioned, after punching, the cards are conveyed by the rollers 105, 106 past the brushes 19 which are the well-known gang punch brushes of the standard punching machine and which may be utilized in the present machine for a gang punching operation if desired. The cards are then conveyed by the rollers 131, 132 and deposited in the discharge hopper 13.

The electrical connections between the devices of the machine may be studied by reference to the wiring diagram shown in Figs. 9a, 9b, 9c and 9d. Referring to Fig. 9a, when the main switch is closed 110 volts A. C. is applied across the transformer T and rectifier R to provide a source of 40 volts D. C. across the two main lines 391 and 392 of the machine.

Cards are placed in the punch hopper P and the start key is depressed completing a circuit from line 391, the start key, magnet R19, line 393 to line 392. Also, the cards in the punch hopper close the hopper card lever contact completing a circuit from line 391, line 394, hopper CLC, magnet R4, line 393 to line 392. Energization of magnet R19 closes contacts R19–1 and completes a circuit from line 391, line 395, normally closed contacts R18–1, normally open contacts R19–1, now transferred, normally closed contacts R234–1, magnet R24 and line 392.

Upon energization of magnet R24, a circuit is completed from line 391, normally open contacts R24–3, now transferred, motor relay HD1 and line 392. The energization of the motor relay HD1 closes contacts HD1–1 and operates the motor M through the 110 volt lines 396 and 397. Also a circuit is completed to the punch clutch magnet PCM and the storage unit clutch magnet SCM. This circuit runs from line 391, contacts R24–4 (Fig. 9b), now transferred, cam contact C1, line 398, punch clutch magnet PCM to line 392 and also from cam contact C1, line 399, storage unit clutch magnet SCM to line 392. Through the clutch connections thus made, the punch picker is operated to feed the first card out of the hopper and between the first set of feed rollers 103, 104 and the storage unit drum is put into operation. As said first card reaches said feed rollers 103, 104, it operates a die card lever contact CLC (Fig. 9a) which in turn completes a circuit from line 391, through magnet R1, line 393 and line 392. During this first card cycle, the "12," "11" and "0" index points positions are read on the first card by the sensing wire contacts.

Magnet R24 will hold until approximately "9.2" time of the first cycle through a circuit which extends from line 391, line 395, cam contact P5, normally open contacts R24–1, now transferred, hold coil of magnet R24 and line 392. To prevent magnet R24 from dropping out near the end of the first cycle, the start key is held depressed for three cycles until the first card arrives at the punch brush station 19 where it operates a punch brush card lever PBCL to complete a circuit from line 391, line 400, punch brush card lever, magnet R10, line 393 and line 392. Energization of magnet R10 completes a hold circuit for magnet R24 which extends from line 391, line 395, normally closed R18–1 contacts, punch stacker switch, normally open R10–2 contacts, now closed, normally open R1–1 contacts, now closed, the now closed R4–2 contacts, closed R24–1 contacts, the hold coil of magnet R24 to line 392. The motor M will now keep running and cards will be fed from the hopper P as long as they are present or until a stop key is depressed. Depression of the stop key controls the energization of the hold coil of a magnet R18. The hold coil of magnet R18, when energized, opens the contacts R18–1 to drop out magnet R24 and thereby stop the machine.

As the pierced and/or punched holes are read by the sensing wires, circuits are completed to enter the readings into the PHM magnets of the storage unit. These circuits extend from line 391 (Fig. 9b), cam contacts PHC–1, which make once every cycle point, common line 319 of the sensing unit, the contacts 316 which have been closed by the sensing wires, the conducting inserts 327 and wires 405 to plug hubs 406. The plug hubs 406 are connected by plug wires 407 to plug hubs 408 which complete the circuits through wires 409 to the PHM magnets of the storage unit and line 392.

The stored readings are distributed to the punch magnets to effect punching by means of circuits extending from line 391, cam contact P1, through the cam contact C23, line 410, common line 411 of the storage unit read out mechanism, the contacts 383 which have been closed by the read out contact levers 377, conducting inserts 384 and wires 412 to plug hubs 413. The plug hubs 413 are connected by plug wires 414 to the plug hubs 415 which complete circuits through the wires 416 to the punch magnets, line 417, normally closed contacts R15–1 and normally closed contacts R37–2 to line 392.

The cam contact C23 makes at the beginning of the "12" through "9" indexing point positions of the machine index at which time the card has traveled three cycle point positions from the sensing wire unit and is in position to be punched.

The pluggable connections between the sensing unit, storage unit and the punch magnets allow maximum flexibility for converting the pierced holes to standard punched holes in any desired field on the card. As a matter of fact, it is oftentimes desirable to punch out the pierced holes themselves, in addition to converting them to punched holes in another field. This can easily be done by using double plug wires from the read out plug hubs to the punch magnet plug hubs.

An interesting feature of the present machine resides in the fact that the sensing wires 305 occupy the same position and perform all the functions as do the punch X brushes of the standard punching machine such as is shown in the previously mentioned reissue patent. As a result, the sensing wires can carry out the functions of the punch X brushes as well as sensing the eighty columns of the card. As an example, suppose it is desired to convert the pierced holes on only those cards that have a special "X" perforation in them. To accomplish this, two hubs 418 and 419 (Fig. 9a) are connected by a plug wire 420 to complete a circuit from line 391, line 421, plug wire 420, magnet R15, line 393 and line 392. Energization of magnet R15 transfers the R15–1 contacts in the punch magnet circuit, thus, breaking the circuit and preventing any punching.

Then, from "9.7" to "13.7" time on the index, which time is three cycle points in advance of normal "X" time, a cam contact PHC–3 (Fig. 9a) makes to complete a circuit from line 391, the PHC–3 cam contact, now closed, wire 422, magnet R265 to line 392. Energization of magnet R265 closes contacts R265–2 in a control circuit, which circuit will serve to condition the punch magnet circuit to effect punching of only those cards that bear a special "X" perforation. This control circuit extends from the plug hub 406 of the sensing wire unit associated with the particular column in the card bearing the "X," a plug wire connection to a plug hub 423 (Fig. 9a), contacts R265–2, now closed, magnet R37 and line 392. A hold circuit for magnet R37 extends from line 391 (Fig. 9b), cam contact P2, closed from "13.1" until "9.5" of every cycle, contacts R37–1, now closed, the hold coil of magnet R37 and line 392. Energization of magnet R37 causes the contacts R37–2 in the punch magnet circuit to transfer and since the R15–1 contacts were also transferred, the punch magnet circuits can be completed for punching the "X" cards.

Another important feature of the present machine resides in the fact that it is possible to sense conductive marks as well as the pierced and/or punched holes on a card, enter all the readings into the previously described storage unit and convert the information into punchings on the card that was sensed.

To condition the machine for sensing the conductive marks, a mark sensing hub MS (Fig. 9a) is connected by a plug wire 424 to "On" hub 425 and a circuit is completed from line 391, through said hubs and plug wire connection, line 426, normally closed contacts BL, the heating element H of a thermal delay relay B and line 427 to line 392. Parallel circuits are also completed from the hub MS through the magnets R234 and MSHD1 and line 428 to line 392. Energization of magnet R234 opens the contacts R234–1 in the pick circuit of magnet R24 thereby preventing the machine from being started in the usual manner, as previously described. Instead, the pick circuit for magnet R24 must now go through the normally open contacts B1 of the thermal delay relay B, the purpose being to delay the start of the punching machine until the cathodes of vacuum tubes used in the mark sensing unit have had time to "warm up."

The energization of the magnet MSHD1 closes contacts HD1–2 (Fig. 9c) to supply power to a rectifier MR and also to the individual heaters 429 of the vacuum tubes. The heater circuit extends from one side of the 110 volt A. C. source, line 430, line 431, through lines 432, 433 and the heaters 429, line 434 (Fig. 9d), line 435, line 436, contacts HD1–2, now closed, and to the other side of the 110 volt source. About the time that the tubes are warm enough for operation, the heating element H closes contacts H1 to energize the thermal delay relay B. The energization of relay B causes the transfer of contacts BL to break the circuit to the heating element H and to establish a hold circuit for relay B through line 426 and hubs 424 and 425. Also, the contacts B1 in the pick circuit of magnet R24 are now closed making it possible to start the machine in the usual manner.

When the hold circuit for magnet R24 was completed, as previously described, a magnet R235 was energized through said hold circuit to effect the closure of a pair of ground interlock contacts R235–2 and R235–3. The hold circuit for magnet R235 is controlled by the energization of a control magnet R232, said magnet R232 serving also to control the mark sensing reading circuit in a manner to be described. The pick circuit for magnet R232 extends from line 391 (Fig. 9b), cam contact P1, line 404a, magnet R232 and line 392. The hold circuit for magnet R235 now extends from line 391 (Fig. 9b), cam contact C5, the now closed contacts R232–1, line 404b, contacts R235–1, the hold coil of magnet R235 and line 392. A parallel circuit is completed from the R232–1 contacts through the hold coil of magnet R232 and line 392.

The mark sensing unit includes twenty-seven vacuum tubes 437, one for each of the well-known mark sensing brushes 601. Each tube includes an anode 438, cathode 439, screen grid 440 and control grid 441. The negative 40 volt output of the rectifier R is supplied, by way of lines 442 and 443, and resistors 444 to the control grids 441. The cathode circuits extend from the positive 40 volt side of rectifier R, line 445, contacts R234-5, now closed, the closed contacts R235-3, R235-2, and lines 446 and 447 to the individual cathodes 439. The rectifier MR rectifies the 110 volt A. C. supply and furnishes positive 150 volt D. C. to the screen grids 440 by way of lines 448 and 449. Also, rectifier MR supplies a negative 150 volt D. C. potential to the cathodes by way of the closed contacts R235-2 and lines 446 and 447. The 40 volt negative bias supplied to the control grids of the tubes prevent current flow to the anodes until conductive marks are sensed by the brushes.

When conductive marks are sensed by the brushes, a circuit is initiated from the positive 150 v. D. C. supply, line 450, the now closed contacts R235-5, R235-6, the common line 451, the mark sensing outer brushes 452, the conductive marks, and the mark sensing inner brushes 453 to hubs 454. The hubs 454 are connected by plug wires to hubs 455 which complete the reading circuit through resistors 456 to the control grids 441. As a result, the control grids are driven less negative with respect to the cathodes. The negative 40 volt bias is neutralized by the 150 volt positive potential, however, the resistors 456 limit the opposing current so that the control grids are driven to approximately zero potential. With the control grids at zero potential, the anode circuits of the tubes are completed to energize the associated magnets MSM of the storage unit. The anode circuits extend from the positive 150 volt D. C. supply, line 457, the contacts R232-3 and R232-4, closed during the sensing of the marks, cam contact P11 which makes for each index point position of the conductive marks, line 458, the magnets MSM, lines 459, the anodes 438, cathodes 439, wires 446, 447, and through the closed contacts R235-2 to the negative side of the 150 volt D. C. supply.

The readings from the sensed conductive marks are, thus, entered into the magnets MSM of the storage device where they are stored for two cycle points, as previously described. The read-out contacts 383, corresponding to the columnar positions of the marks sensed, are then closed concurrently with the arrival of the card at the punching station to effect the punching, anywhere column-wise, on the mark sensed card.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operable machine for perforating records having rows of index point positions for data designations, perforating means, a first sensing means disposed a predetermined distance from said perforating means for sensing rows of data designations, a second sensing means disposed a different predetermined distance from said perforating means for sensing different rows of data designations, storage means, a first control means under control of said first sensing means, a second control means under control of said second sensing means, said first and second control means being spatially disposed to operate in synchronism with the sensing of the index point positions by the respective first and second sensing means for entering into said storage means at respective time intervals data represented by the sensed designations, and means under control of said storage means for operating said perforating means to reperforate the sensed data.

2. In a cyclically operable machine for recording on a record having rows of index point positions for groups of different type data designations, recording means, a first sensing means disposed a predetermined distance from said recording means for sensing rows of one group of data designations on said record, a second sensing means disposed a different predetermined distance from said recording means for sensing different rows of another group of different type data designations on said record, storage means, a first control means under control of said first sensing means, a second control means under control of said second sensing means, said first and second control means being spatially disposed to operate in synchronism with the sensing of the index point positions by the respective first and second sensing means for entering into said storage means at respective time intervals data represented by the sensed designations, and means under control of said storage means for operating said recording means to concurrently record on said record the stored data.

3. In a cyclically operable machine for perforating a record having rows of index point positions for perforate and imperforate data designations, perforating means, a first sensing means disposed a predetermined distance from said perforating means for sensing rows of perforate data designations on said record, a second sensing means disposed a different predetermined distance from said perforating means for sensing different rows of imperforate data designations on said record, storage means, a first control means under control of said first sensing means, a second control means under control of said second sensing means, said first and second control means being spatially disposed to operate in synchronism with the sensing of the index point positions by the respective first and second sensing means for entering into said storage means at respective time intervals data represented by the sensed designations, and means under control of said storage means for operating said perforating means to concurrently perforate on said record the stored data.

4. In a cyclically operable machine for perforating a record having rows of index point positions for perforate and imperforate data designations, perforating means, a first sensing means disposed a predetermined number of cycle points in advance of said perforating means for sensing rows of perforate data designations on said record, a second sensing means disposed a different predetermined number of cycle points in advance of said perforating means for sensing different rows of imperforate data designations on said record, storage means, a first control means under control of said first sensing means, a second control means under control of said second sensing means, said first and second control means being spatially disposed to operate in synchronism with the sensing of the index point positions by the respective first and second sensing means for entering into said storage means at respective time intervals data represented by the sensed designations, and means under control of said storage means for operating said perforating means to concurrently perforate on said record the stored data.

References Cited in the file of this patent

UNITED STATES PATENTS

| | | |
|---|---|---|
| Re. 21,133 | Lake | June 27, 1939 |
| 2,007,391 | Bryce | July 9, 1935 |
| 2,011,272 | Duggan | Aug. 13, 1935 |
| 2,172,758 | Rice et al. | Sept. 12, 1939 |
| 2,237,898 | Bitner | Apr. 8, 1941 |
| 2,275,396 | Johnson | Mar. 3, 1942 |
| 2,290,150 | Hirschfeld | July 21, 1942 |
| 2,379,828 | Rubidge et al. | July 3, 1945 |